US012285969B1

(12) United States Patent
Vaca

(10) Patent No.: US 12,285,969 B1
(45) Date of Patent: Apr. 29, 2025

(54) METHOD FOR PLACING A VINYL CLING ONTO AN INFLATABLE VINYL SURFACE

(71) Applicant: Emily Catherine Vaca, Chicago, IL (US)

(72) Inventor: Emily Catherine Vaca, Chicago, IL (US)

(*) Notice: Subject to any disclaimer, the term of this patent is extended or adjusted under 35 U.S.C. 154(b) by 0 days.

(21) Appl. No.: 18/439,908

(22) Filed: Feb. 13, 2024

Related U.S. Application Data

(60) Provisional application No. 63/445,408, filed on Feb. 14, 2023.

(51) Int. Cl.
*B44C 1/10* (2006.01)
*E04H 4/00* (2006.01)
*G09F 7/12* (2006.01)

(52) U.S. Cl.
CPC ............. *B44C 1/10* (2013.01); *E04H 4/0025* (2013.01); *G09F 7/12* (2013.01)

(58) Field of Classification Search
CPC ............ B44C 1/10; E04H 4/0025; G09F 7/12
See application file for complete search history.

(56) References Cited

U.S. PATENT DOCUMENTS 591,501 A 10/1897 Schonborn
3,729,847 A * 5/1973 Chandos ............. G09F 15/0025 40/604
5,763,052 A * 6/1998 Carr ..................... B42D 25/328 428/688
5,778,581 A * 7/1998 Bailey ................. G09F 15/0025 40/212
5,899,010 A * 5/1999 Peck ......................... G09F 7/12 40/594
5,914,158 A 6/1999 McGuiness
5,970,638 A 10/1999 Henley
11,352,185 B2 6/2022 Borrero et al.
2006/0023292 A1* 2/2006 Simone ................ D06P 1/0096 359/288
2007/0031592 A1* 2/2007 Eskandry .................. G09F 7/12 427/256

(Continued)

OTHER PUBLICATIONS

DPS Banner, www.DPSBanners.com, "How to Apply Static Window Clings", Aug. 21, 2007, https://www.dpsbanners.com/howtostaticclings.php. (Year: 2007).*

(Continued)

*Primary Examiner* — Christopher W Raimund
(74) *Attorney, Agent, or Firm* — Carmody MacDonald P.C.; Dennis J M Donahue, III; Kevin C. Staed

(57) ABSTRACT

The invention is a vinyl cling intended for use with a vinyl inflatable structure, such as an inflatable pool, and innovative placement method thereof. Relocatable placement of the vinyl clings on an inflatable structure allows a user to customize the structure itself for various events. In operation, the user can remove the cling from a backing sheet on which the clings are stored, wet one side of the cling, the space on the structure where the cling is intended to be placed, or both, press the cling onto the structure and again wet the cling and space on the structure around the cling to assure that the cling is secured thereto. The user can then remove the cling and repeat this process over and over without leaving any residue on the structure from an adhesive material.

16 Claims, 10 Drawing Sheets

(56) References Cited

U.S. PATENT DOCUMENTS

2011/0243628 A1 10/2011 MacLean et al.

OTHER PUBLICATIONS

Adcraft Decals, “Static Cling Vinyl Decals”, Aug. 22, 2021, https://www.adcraftdecals.com/Products/StaticVinyl/tabid/139/Default.aspx. (Year: 2021).*

Static Clings [online]. Sticker Mule, Feb. 13, 2023. Retrieved from the Internet: <URL: https://www.stickermule.com/products/static-clings>.

Sticker Mule [online]. Sticker Mule, Feb. 13, 2023. Retrieved from the Internet: <URL: https://www.stickermule.com/uses/vinyl-clings>.

Removable Peel and Stick Decals [online]. Amazon, Feb. 2, 2024. Retrieved from the Internet: <URL: www.amazon.com/Stickers-DILIBRA-Removable-Waterproof-Bathroom/dp/B091BSHF9G/ref=sr_1_21?keywords=DILIBRA&qid=1676037215&sr=8-21>.

* cited by examiner

METHOD FOR PLACING A VINYL CLING ONTO AN INFLATABLE VINYL SURFACE

CROSS-REFERENCE TO RELATED APPLICATIONS

This application claims priority from U.S. Provisional Patent Application No. 63/445,408 filed on Feb. 14, 2023 which is incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to vinyl clings, and more particularly to reusable vinyl clings suited for use with inflatable vinyl structures.

Related Art

Stickers, vinyl clings, static clings, decals, labels and the like have long been used as custom décor for various surfaces and structures. Most stickers, decals and labels are made of a paper or a plastic composite with a graphic design on the front side and a sticky adhesive material on the back side such that the décor item can be stuck to a hard surface. Although the adhesive material may effectively attach the décor item to the desired surface, these décor items cannot be readily relocated on the surface of the intended structure, easily stowed and reused at a later time and are generally limited to use with hard, non-pours surfaces like glass or metal. When the sticker, decal or label is removed, it may tear as a portion of the adhesive releases from the base structure while another portion remains attached thereto and even if the entire décor item is removed intact, the adhesive layer remaining on the back side is not as effective when used to reattach the décor item to another surface. Furthermore, at least some adhesive residue may be left behind on the surface to which it was stuck, especially after one or more days in the sun in which the adhesive softens and may even melt, thereby requiring the surface to be cleaned. Thus, there is a desire to those in the art to provide a décor item and placement method that not only allows the graphic design to be displayed on multiple surfaces at different times without risk of destruction or failure from use-to-use but also which does not leave behind residue the surface on which it was placed after removal.

To combat the problems with adhesives, persons in the art developed and use vinyl clings that releasably attach to surfaces without an added adhesive layer. Instead, the vinyl clings are made from highly plasticized vinyl films which attach to smooth, non-porous surfaces byway of a suction effect between the plastic film and abutting surface. For example, STICKER MULE™ describes "static cling" and "vinyl cling" product lines that are designed to hold to glass surfaces without adhesive. Although these clings do not require an adhesive, they are generally limited to use with hard surfaces such as windows, mirrors, or tile and have not yet been adapted for use with soft, three-dimensionally shaped surfaces that do not have uniform planar face. Similarly, suitable surfaces recommended by another popular brand of adhesive decal, DILIBRA™, are all hard surfaces, including glass, ceramic, stainless steel, smooth wallpaper, wood, and a flat painting wall. Accordingly, there is a desire in the art to provide a cling that does not use an adhesive layer that prohibits multiple uses and leaves behind unwanted residue but also which can be used on irregular surfaces.

There is a particular need in the art to provide custom graphic clings with inflatable structures that not only have irregular surfaces when inflated but which have an entirely different shape when deflated. As noted above, adhesive stickers and decals fail to provide a sufficient solution not only because they can leave residue and are not readily reused but also because they could not be left on the inflatable while it was being deflated and stored because it would crumble and crease, compromising the appearance of the graphic design on the sticker or decal itself. Similarly, as the vinyl of the inflatable structure stretches and contracts overtime due to different temperature and as water pressure continues to stretch inflatable pools outwards, the stickers would not be able to stretch with the inflatable or removed and reapplied in these different scenarios over time. Adhesive stickers and decals are further insufficient for use with outdoor inflatables because the adhesive could melt in the heat and direct sun during the normal use of the inflatable pool, causing the sticker to not be able to be removed easily. Furthermore, any adhesive residue left behind would cause the inflatable to stick to itself during the deflation and storage configuration, compromising its ability to retain its original shape once reinflated.

SUMMARY OF THE INVENTION

The repositionable, resusable vinyl cling decoration adheres to the smooth vinyl surface of an inflatable structure, such as a pool, allowing users to decorate their inflatable structure to their liking. Once decorated, the user creates a customized inflated structure through their desired positioning of the vinyl decorations. After adding a few droplets of water to the smooth vinyl surface and/or the side of the vinyl cling that faces the vinyl surface, the cling adheres to the surface like a suction cup by simply laying the cling flat onto the surface and smoothing out any air bubbles, until the user peels it off.

Because the two vinyl substrates create suction, the cling does not need adhesive to attach to the inflatable vinyl material. Therefore, it can be removed easily without leaving any residue behind on the surface of the base structure. Additionally, because the vinyl cling decoration is repositionable, the user is able to create many configurations of designs on their inflatable pool and thereby change the look through the use of different vinyl cling decorations that show various designs. The user is also able to use the inflatable surface for custom messaging to celebrate a special occasion, such as a birthday or holiday, and remove the vinyl cling decorations once the occasion has passed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
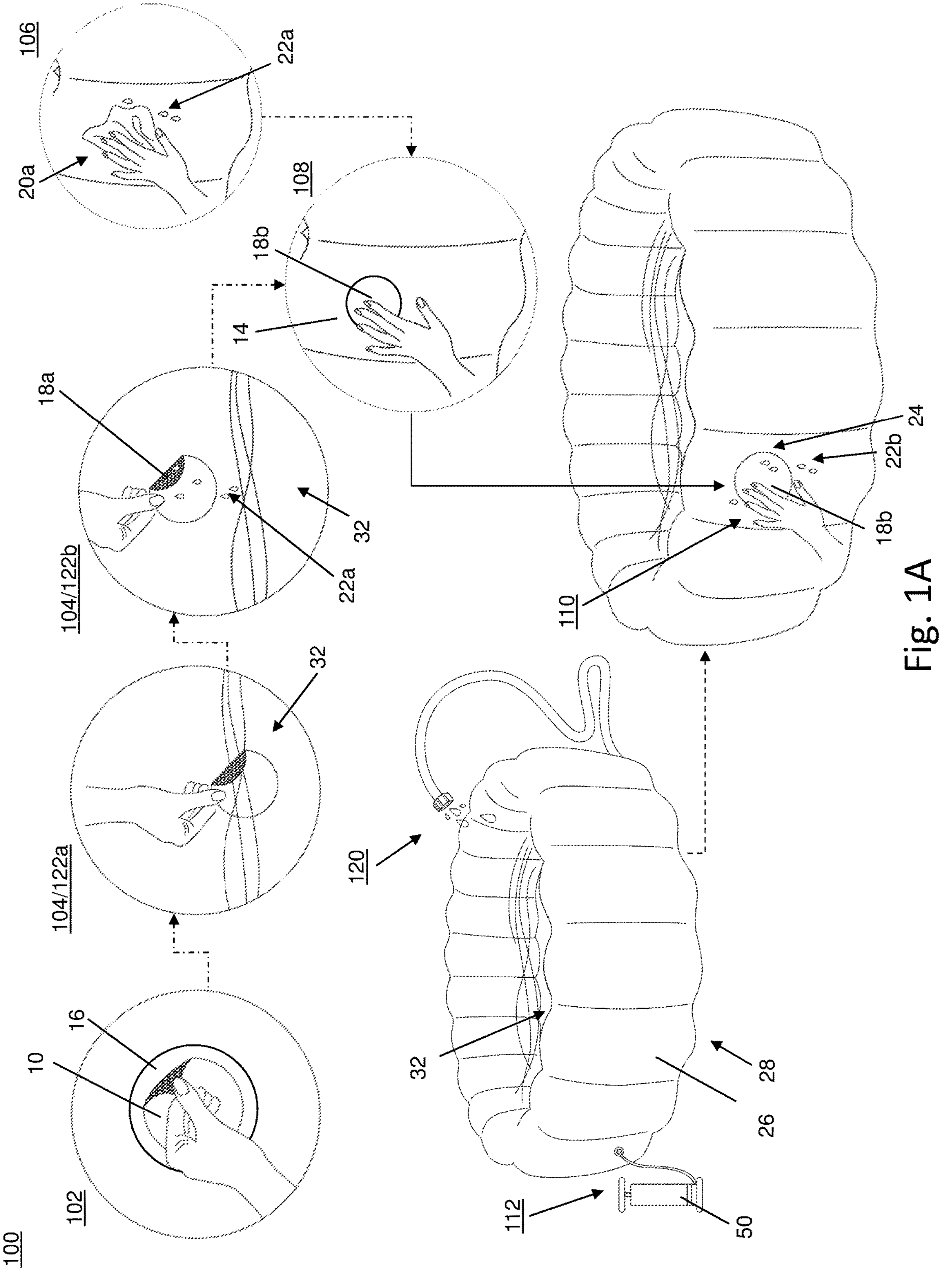
FIGS. 1A-1C are a schematic flow-charts of the placement method described herein.

The following description of the preferred embodiment(s) is merely exemplary in nature and is in no way intended to limit the invention, its application, or uses.

The flexible cling decal for vinyl surfaces and innovative placement method described herein particularly relates to the creation of custom inflatable structures, such as pools, furniture, toys and bounce houses, for a particular event but may be used with any type of vinyl surfaces that has a nonplanar face. In the preferred embodiment, rather than having printed designs on individual structures, the clings allow customization of the base structure with temporary custom clings. The clings allow the custom addition of designs, including images, colors, messages and the like, to flexible, inflatable vinyl surfaces like inflatable pools whereas the traditional process of applying designs to vinyl surfaces is completed during manufacturing and provides a permanent solution. Yet, there are many needs to customize an inflatable for a single use, such as a promotional event or special occasion like a birthday party. Therefore, the repositionable cling decal and innovative placement method described herein allows the user to customize their inflatable for a single occasion or multiple occasions between uses by removing the decal during the inflation and deflation process and reapplying once the structure is inflated and ready for use.

As evident from the description of the invention, the cling decals of the present invention are flexible and bendable, repositionable, reusable, waterproof, water-activated, non-adhesive, removeable, and customizable for accessorizing and personalizing. The cling decals allow inflatable structures to be customized and personalized for birthdays, bachelorette parties, and any other special events or just for a little extra fun. The cling decals do not damage the sidewalls of the inflatable structures and do not leave any adhesive residue on the sidewalls, even after days in the hot sun.

The innovative placement method 100 illustrated in FIGS. 1A, 1B and 1C begins with removing 102 the cling 10 from a backing sheet 16, which can also be used to store the cling after it is removed from the base structure as described below. The user then optionally wets 104 the attachment side 18*a* of the cling that will face the surface 14 of the structure 26, wets the 106 the space 20*a* on the surface of the structure where the cling will be placed with a first volume of water 22*a* or wets both the cling and the surface of the structure. After the space and cling are wet, the user presses 108 the cling onto the space until a frictional connection is created between the surface of the structure and the side of the cling with the water from the wetting step acting as the bonding agent. To further secure the cling to the structure, the user coats 110 the uncovered side 18*b* of the cling, the perimeter edge 44 and the area 24 of the structure proximate to the perimeter of the cling with another volume 22*b* of water to assure water seeps between the cling and surface of the structure if a secure bond was not established during the initial wetting and pressing steps.

Figure 1B:
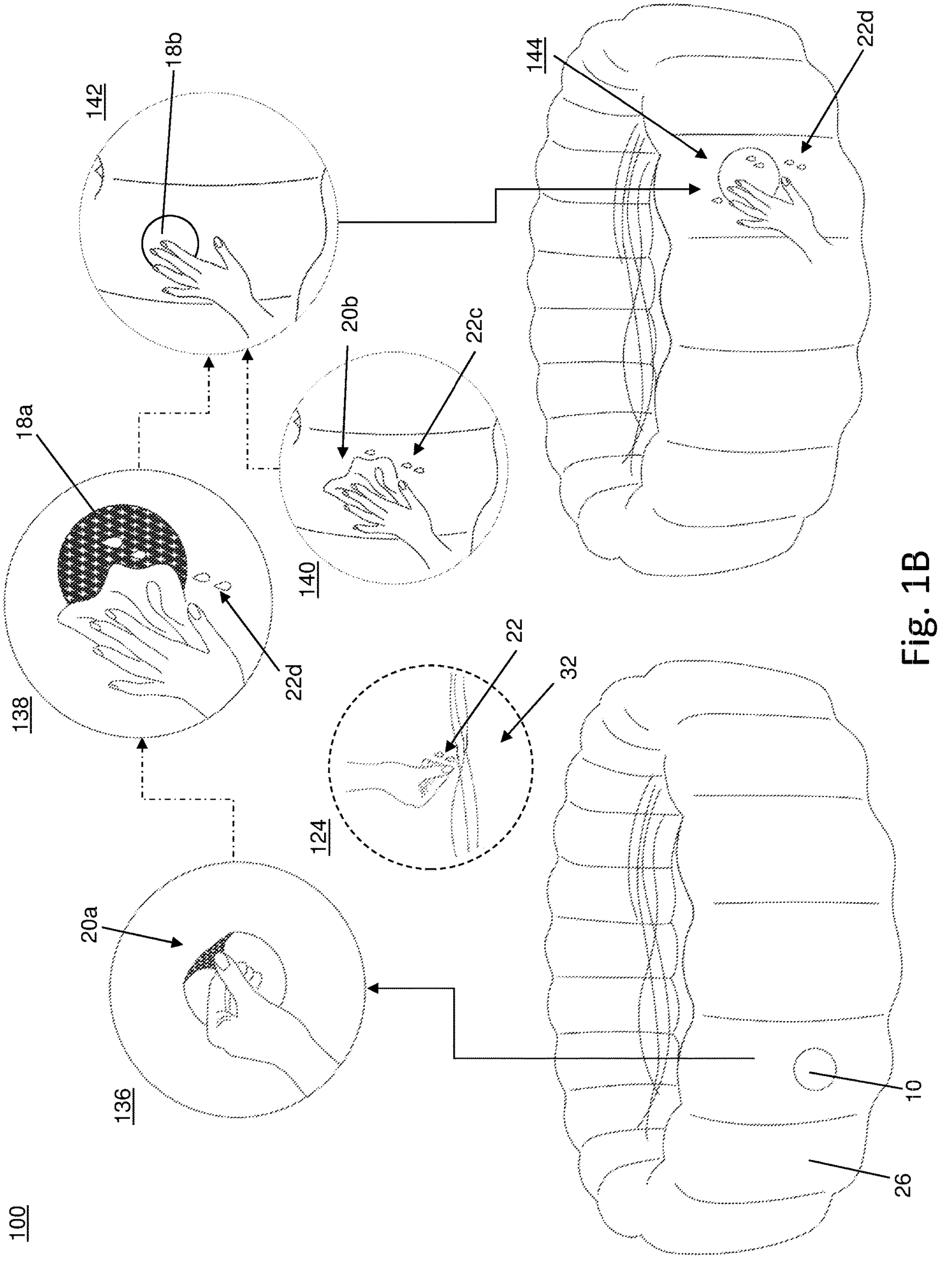
Figure 1C:
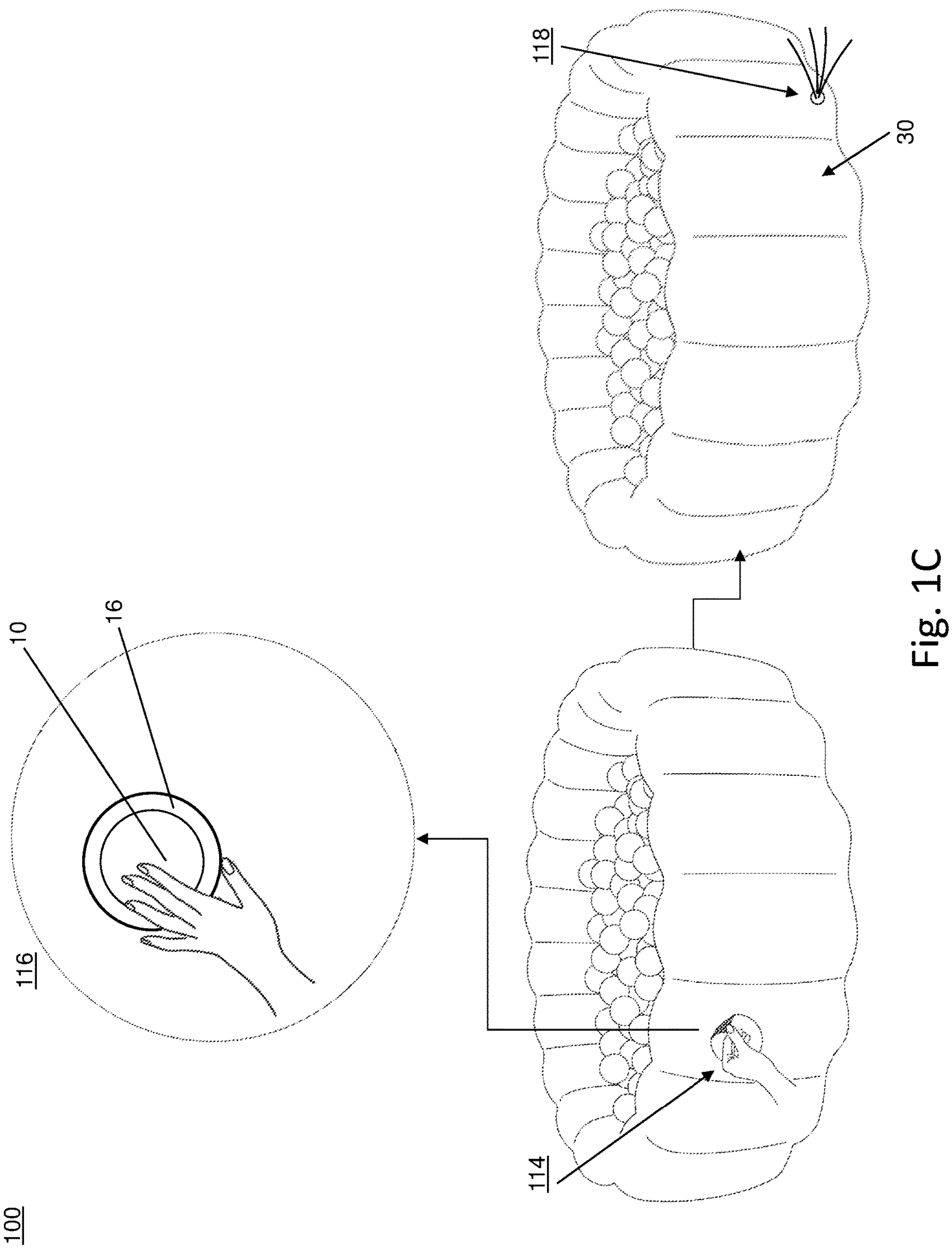

Although the user may collect water or a similar liquid from any readily available source when attaching the cling to the base structure, when the inflatable structure is a pool filled with water 32 or some other liquid, solution or fluid, the user can use the water from the pool in the attachment process as illustrated in FIG. 1A. The user first fills 120 the pool with a volume of water, dips 122*a* the cling into the pool water to wet the attachment side, removes 122*b* the wetted cling from the pool and then presses the cling onto the surface of the pool. Similarly, the user can collect water from the pool to coat the uncovered side of the cling to assure a secure connection. As the user may elect to wet the space on the pool instead of, or in addition to, wetting the attachment side of the cling, a user can collect 124 water from the pool using a rag or their hand to apply water from the pool to the space where the cling will be attached as well as to the uncovered side of the cling once it is pressed onto the structure or for any other point at which water is needed according to invention described herein.

Alternatively, when the clings are used in dry scenarios or on pools that are not filled with water, the user can collect liquid from another source rather than using pool water. For example, an inflatable pool structure can be used as a ball pit that contains dry balls rather than water. In this scenario the user can wet a rag or scoop water from a sink, nearby faucet or other water source and subsequently wet at least one of the side of the cling and the space of the structure where the cling will be attached. Thus, the application of the cling on a pool with water is not intended to be limiting and the cling decal of the present invention can be used with any number of vinyl structures, such as furniture, floats, coolers, bounce houses, balls, fountains and the like.

Figure 2:
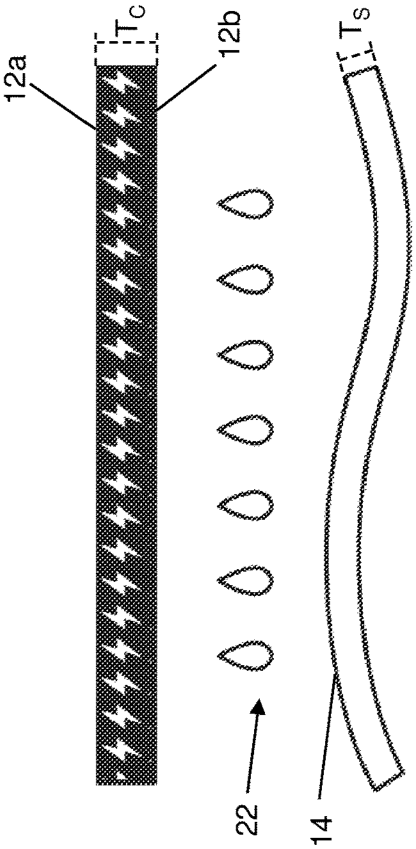
FIG. 2 is an exploded cross-sectional view of the cling, water bonding agent and vinyl surface according to the invention described herein.

In contrast to stickers or adhesive clings in the prior art which are designed to remain in a single location once stuck thereto, the cling described herein is intended to be repositionable on many locations across one or more base structures. Accordingly, the user can remove 136 the cling from the space on the inflatable structure and replace 142 the cling at a different location according by simply rewetting the cling 138, wetting 140 the new space on the structure, or both, and coating the 144 cling and area around the new space after the cling is pressed thereon according to the steps taken when originally placing the cling on the structure as illustrated in FIG. 1B. As noted herein, the absence of any adhesive layer on the cling allows the cling to be reused any number of times according to the same process for attaching the cling in the first instance with water being the only bonding agent between the cling and the base vinyl structure as illustrated in FIG. 2.

In the preferred embodiment when the cling is being used with an inflatable structure 26, the user preferably first inflates 112 the structure into a three-dimensional shape 28, such as with an air pump 50, before pressing the cling onto the desired space of the surface of the structure. Similarly, as illustrated in FIG. 1C, it is preferred that the user remove 114 the cling before deflating 118 the structure to prevent the cling from wrinkling, folding or being damaged as the structure deflates and loses its shape. Once removed, the user can place 116 the cling back onto the backing sheet and store them separately from the deflated inflatable structure.

Figure 3A:
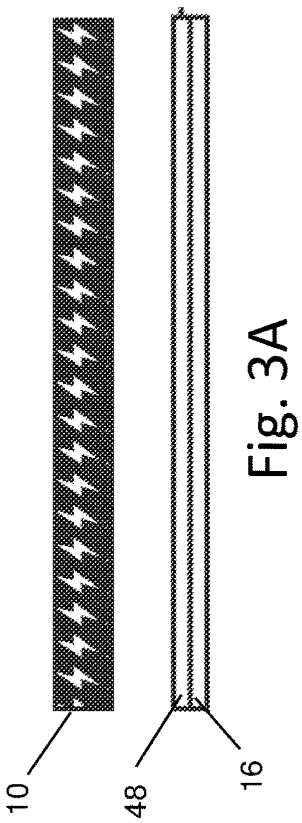
FIGS. 3A and 3B are cross-sectional views of the clings and backing sheets according to the preferred embodiment of the invention described herein FIGS. 4A and 4B respectively show the uncovered side and the attachment side of a cling attached to a transparent structure according to the invention described herein.
Figure 3B:
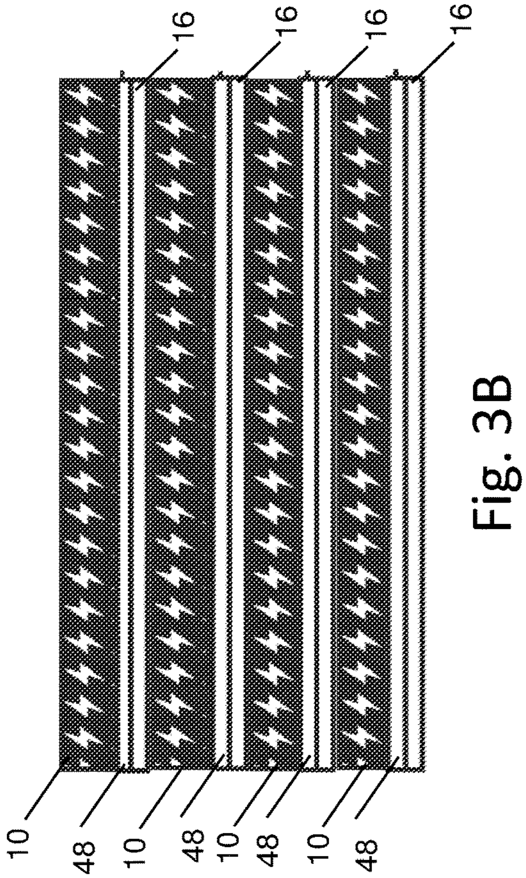

As illustrated in FIGS. 3A and 3B, the backing sheet is preferably made from a sheet of paper that has a silicone coating 48 on the side that holds the cling. The ability to readily remove the clings from the inflatable structure is the same benefit as traditional clings that are used on hard surfaces. However, a benefit of the backing sheet of the present invention is that the cling can be placed back onto it to store the cling while the backing sheet provides sufficient stiffness to prevent the cling from wrinkling or folding over on itself, protecting the cling material and designs printed thereon from damage. Additionally, when multiple clings are stored in a stacked arrangement, the use of the backing sheets with each one of the clings prevents the clings from damaging one another, particularly when designs are not screen printed, wherein the clings sticking together can cause ink to peel off. In alternative embodiments, backing sheets are not required and the clings can be stacked directly onto one another without any backing.

Figure 4B:
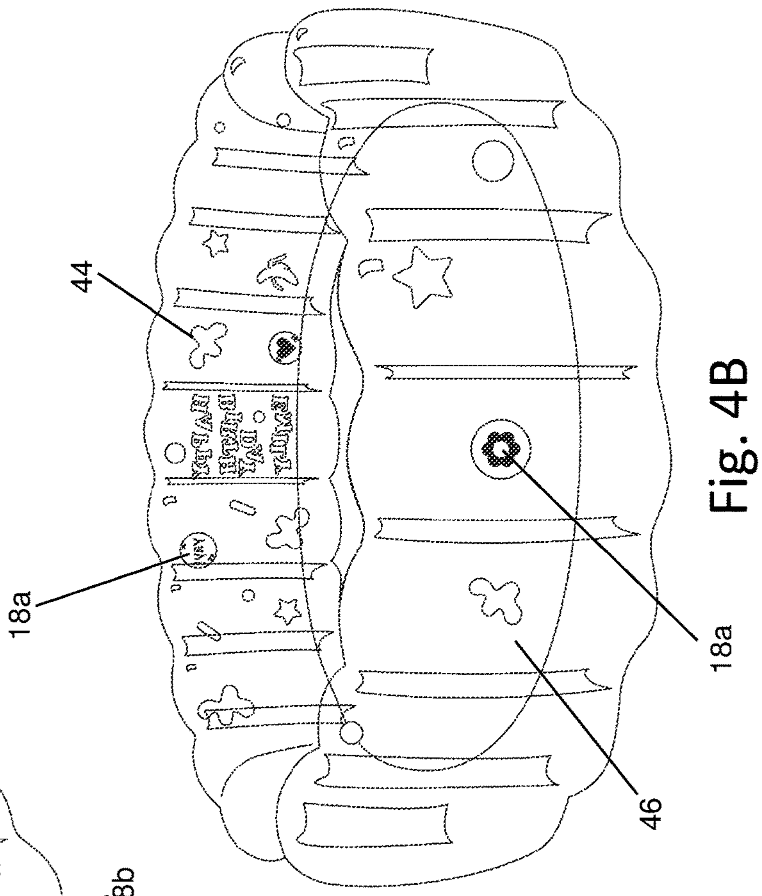
Figure 4A:
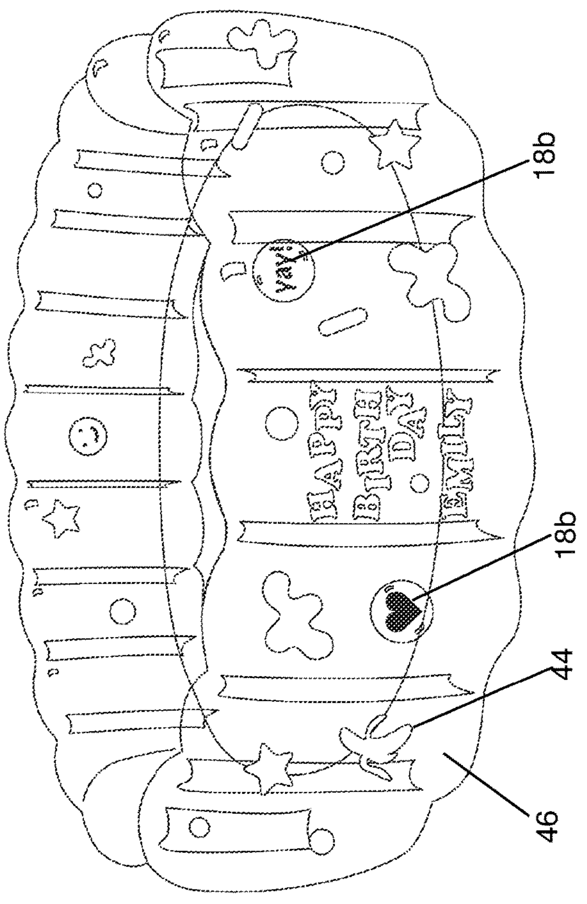

The vinyl cling shown in the drawings according to the invention described herein is a thin lamina made from a pliable plastic material having a front side 12_a_, back side 12_b_, perimeter edge and thickness (Tc) between the front and back sides. At least one side of the cling includes a design, such as a color, logo, text, or other artwork, which is displayed on the surface of the structure after the cling is attached thereto according to the innovative method described above and shown in FIG. 4A In an alternative embodiment, a design is displayed and visible on both sides of the cling when the cling is attached to a transparent surface 46 as shown in FIG. 4B.

The vinyl cling described herein in the preferred embodiment is made from a uniform material such that either side of the cling could function as the attachment side and connect to the base structure with the other side functioning as the display side, uncovered and visible when the cling is connected to the base structure. Designs printed on the cling may therefore be on one side with the opposite side being the attachment side, without any printing. Alternatively, designs could be mirrored on both sides of the cling so the user does not have to specifically attach one side to the base structure and leave the other side uncovered. This construction also allows for clings to have different designs on opposite sides as shown in FIG. 6C such that the user can select which design they would like to show based on which side functions as the attachment side that is not visible and which side functions as the display side when the cling is attached to a non-transparent base structure.

Figure 5A:
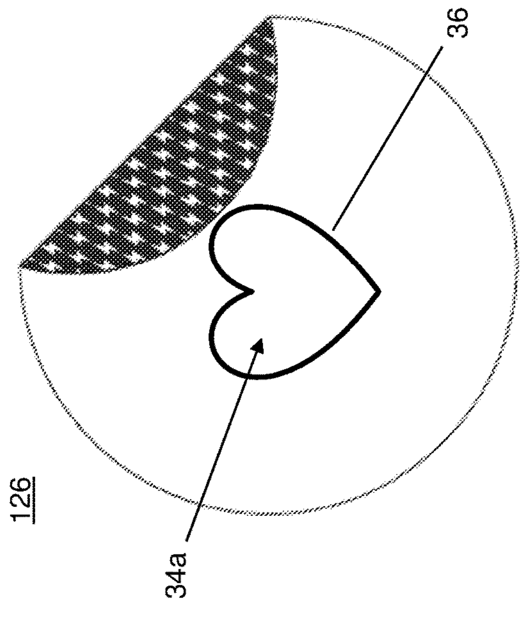
FIGS. 5A-5D show alternative embodiments clings according to the invention described herein.
Figure 5B:
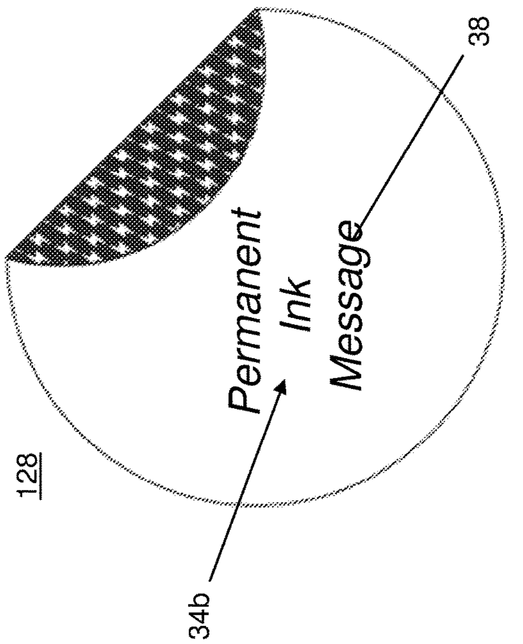
Figure 5C:
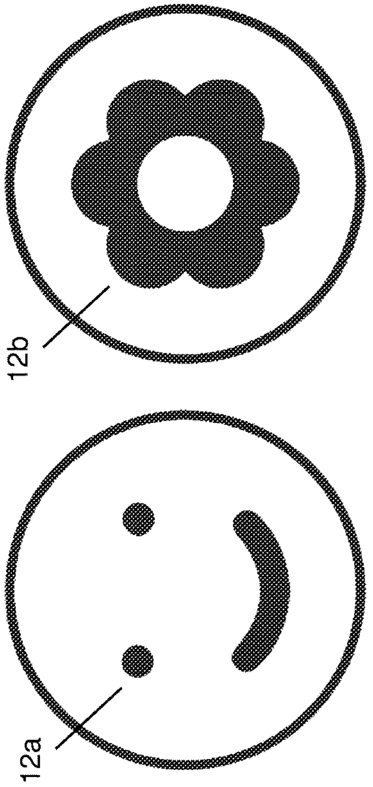
Figure 5D:
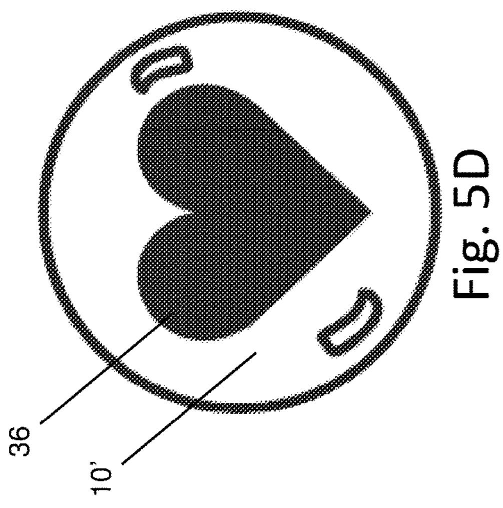

Further still, the cling could be a transparent vinyl 10' as shown in FIG. 5D such that print on one side of the cling is visible through the body of the cling or graphic designs may be printed on both sides of the cling and displayable on both sides when the cling is attached to a transparent structure. More particularly, each side of the cling lamina is visible where the attachment side of the cling pressed onto the surface of the base structure is unobstructedly visible through the transparent material and the uncovered side is visible as it is open to the surrounding area. This configuration further improves upon clings and stickers in the prior art that are limited to single display on a single side and do not readily display designs on both sides.

Regardless of the design provided on the cling or perimeter shape thereof, it is an aspect of the vinyl cling to be devoid of any adhesive layer such that no residue is left on the base structure when the cling is removed and the functionality of the cling does not diminish from use to use as the adhesive layer is lost. The vinyl cling can also have the same thickness as the flexible, inflatable structure to which it is to be applied (Ts), so that it can more conform to the structure's shape and contours as well as flex and expand slightly with the structure during its use. Regardless of relative thickness between the cling and the base structure on which it is temporarily attached, the thickness of the cling is small enough so that the cling remains pliable and deformable into a nonplanar shape.

The preferred cling includes designs 34 that are displayed 148 on the structure when the cling is attached thereto so that users can select particular designs and decorate their structure as they see fit. These designs are not intended to be limiting and include but are not limited to a host of colors, images, text messages, sketches and the like wherein the particular design printed on the cling does not affect the method by which the cling is attached to the base structure. Furthermore, the shape of the perimeter of the cling is not intended to be limiting and may reflect the design printed on the cling so long as the sides of the cling are two-dimensional and the cling maintains its pliable construction. For example, the clings on the structures in FIGS. 8 and 9 have various perimeter shapes that outline various designs such as hearts, smiley faces, stars, letters and the like. Similarly, FIG. 5A shows a cling provided 126 with a preprinted design 34_a_ that is a heart image 36 such that the heart would be displayed on the base structure when the cling is attached thereto according to the inventive method described herein.

In place of or in addition to a preprinted design, such as the heart shown in FIG. 5A, the cling also allows for further customization by writing 128 a custom design 34_b_ on the side of the cling with a permanent ink marker 38 as shown in FIG. 5B. The user therefore has a greater ability to customize the base structure beyond placement of the preprinted clings that is limited to the types of designs made by the manufacturer and the collection of clings available to the user. In operation, when the user wants to further customize the cling, they can simply write on the cling to display a new design, which could include a drawing, text message or the like, before it is placed onto the structure or after it is placed onto the structure such that the written design is displayed on the structure after the cling is attached thereto.

Figure 6:
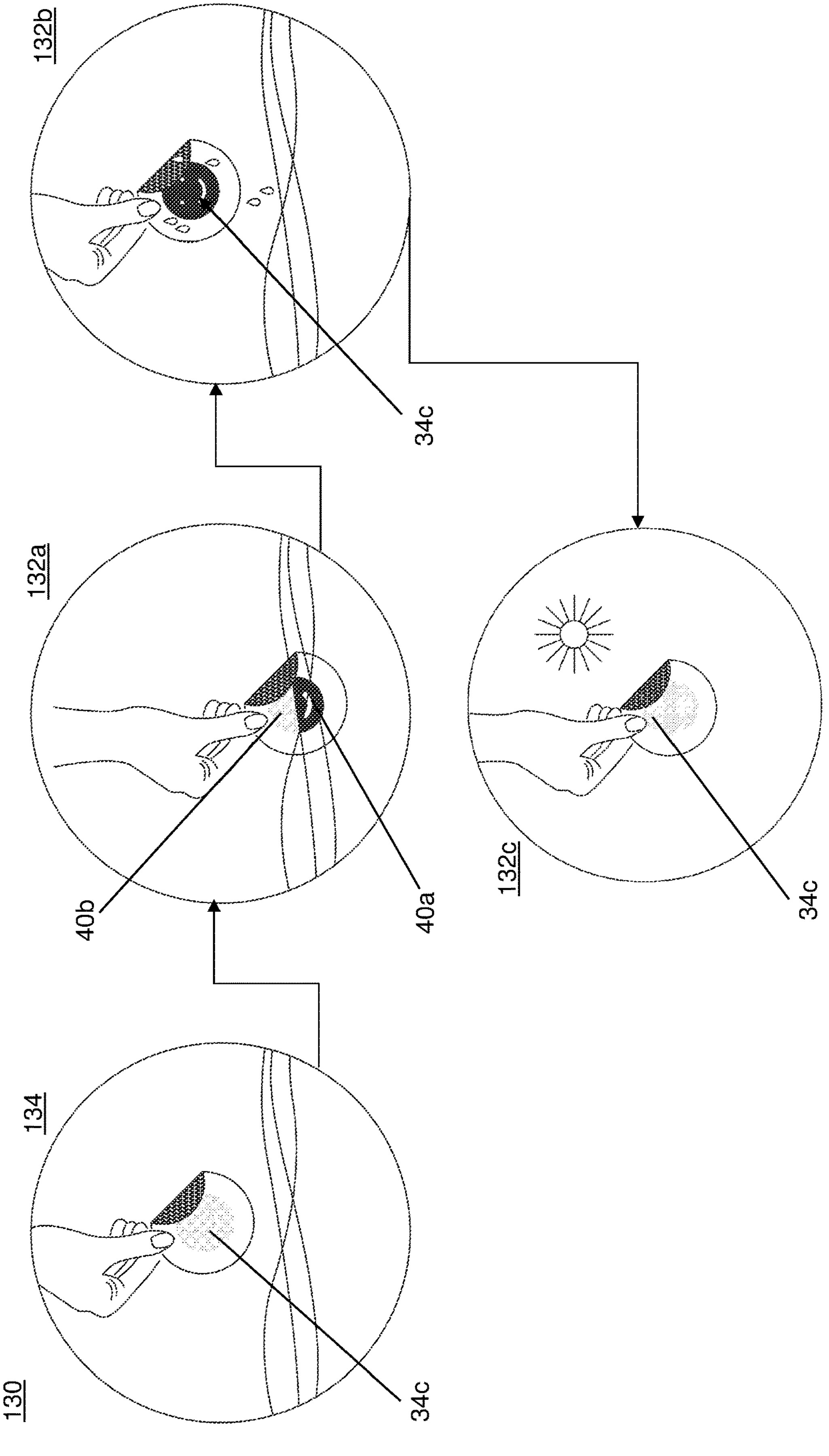
FIG. 6 is a schematic flow-chart of the activation of water activated ink according to another cling embodiment according to the invention described herein.

In yet another embodiment of the cling described herein, the provided 130 design can include water-activated ink 34_c_ that is printed onto the side of the cling such that the design printed in permanent ink is visible 40_a_ when the water-activated ink is activated and hidden 40_b_ when the water-activated ink is deactivated 134 as illustrated in FIG. 6. Given water is required to sufficiently attach the cling to the structure according to the inventive method described herein, the water-activated ink can be activated in the same step taken by the user when wetting each side of the cling by dipping 132_a_ the cling into a water bath and removing 132_b_ the cling once the ink is activated. Alternatively, the ink could be active by wiping water onto the face of the cling with a rag or hand or when splashed with water as also described above. Once activated and placed onto the vinyl surface as described herein, the water-activated ink will display the design until it dries and hides the design from view. Accordingly, the user can deactivate the water-activated ink by drying 132_c_ the side of the cling and even further customize the look of their structure.

Figure 7A:
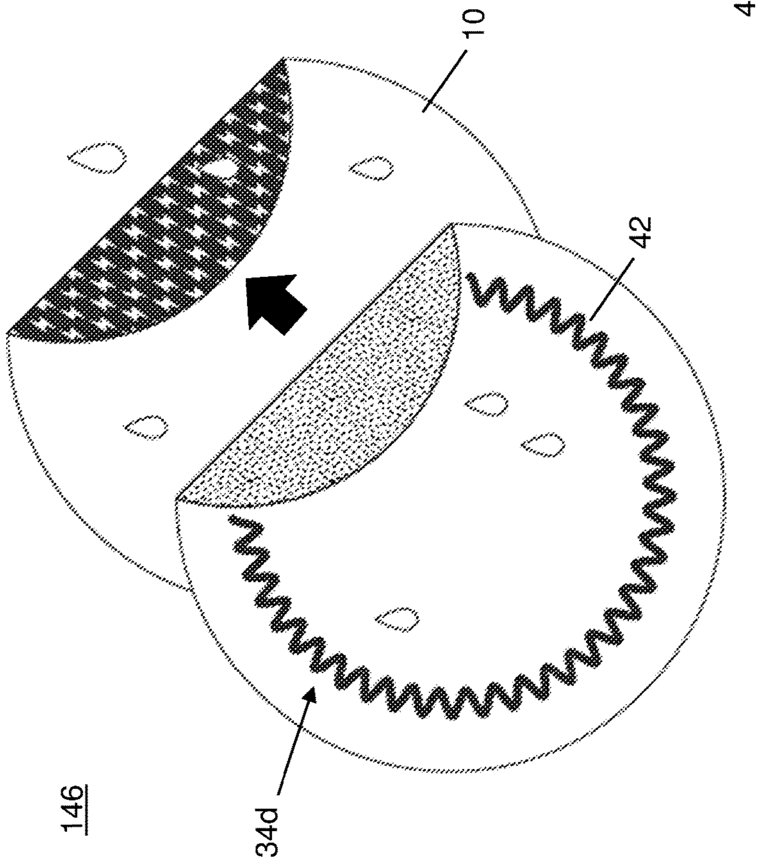
FIGS. 7A and 7B respectively show an illustrative top view and a cross-sectional view of a cling according to the invention described herein supporting a design from a traditional adhesive decal.
Figure 7B:
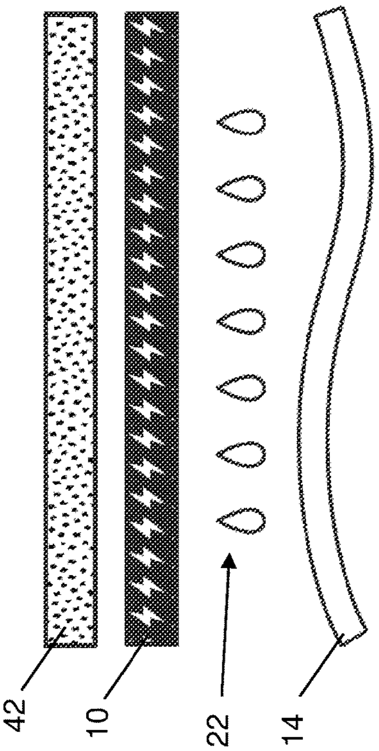

As yet another option for the present invention, the cling lamina may have no printing on either side and a design 34_d_ is provided 146 via a traditional flexible decal 42 that is adhesively mounted onto one side of the cling lamina with an adhesive layer as illustrated in FIGS. 7A and 7B. The base layer may be sized to match the dimensions of the traditional flexible decal or may be larger than the flexible decal so long as the perimeter of the flexible decal is within the perimeter of the base layer to prevent the adhesive from contacting base structure. As with the clings described above, the base layer can either be opaque or transparent. The traditional decal is made from a flexible sheet of material, preferably a thin layer of plastic although other flexible materials could alternatively be used. An adhesive layer is stuck to one side of the flexible sheet and the flexible sheet also has printing on at least one of its sides. The printed side of the decal is preferably on the opposite side of the flexible sheet from the adhesive layer although it is possible that the adhesive layer to be applied over a printed side of the flexible sheet.

The particular vinyl base structure on which the clings are attached is not intended to be limiting but the surface is preferably a three-dimensional inflatable vinyl structure having a nonplanar geometry, such as the sidewall of an inflatable pool. The preferred pool has an inflated configuration and can be deflated 30 when not in use. When being used, the pool is inflated and is capable of holding a volume of water. In contrast to vinyl clings in the prior art that utilize humidity or moisture in the air to adhere to smooth planar surfaces, the clings described herein use water as a bonding agent between the surface of the inflatable vinyl structure and the attachment side of the cling to attach to nonplanar surfaces of three-dimensional inflatable structures. The pliability of the cling and the use of the liquid bonding agent thereby allows the cling to attach to nonplanar surfaces as described herein.

Figure 8B:
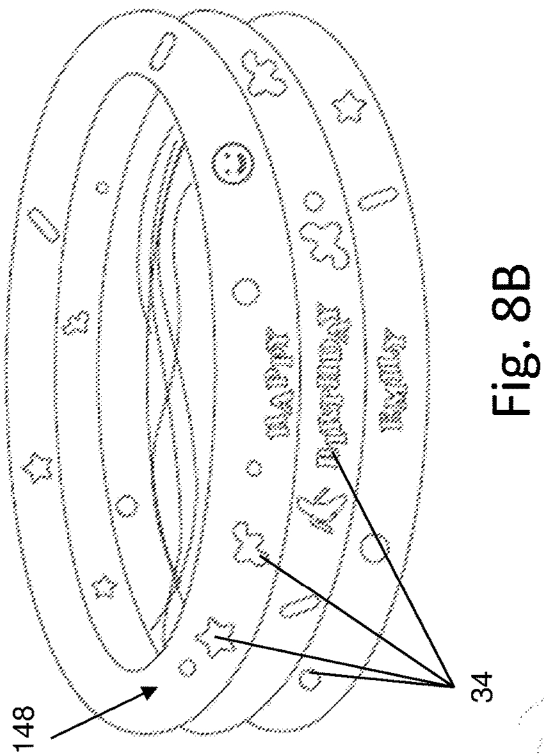
FIGS. 8A-8C show a first set of example vinyl base structures holding water according to the invention described herein.
Figure 8A:
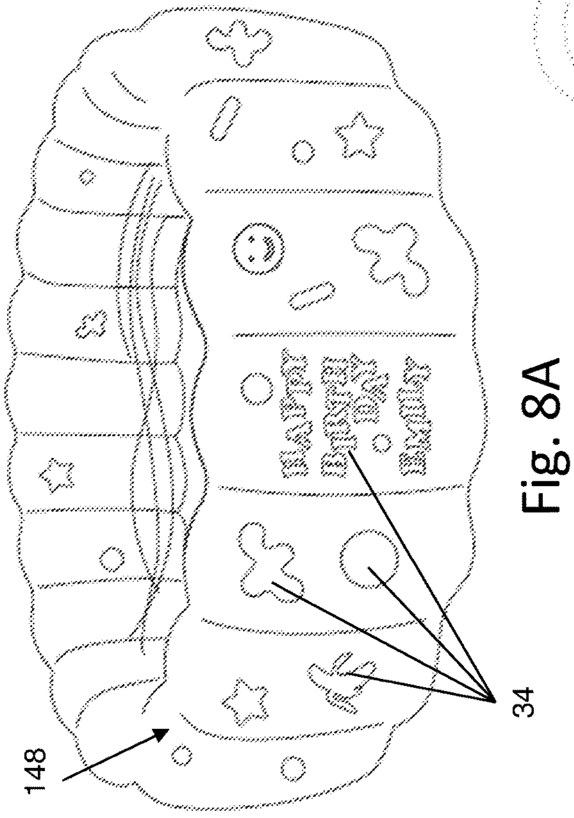
Figure 8C:
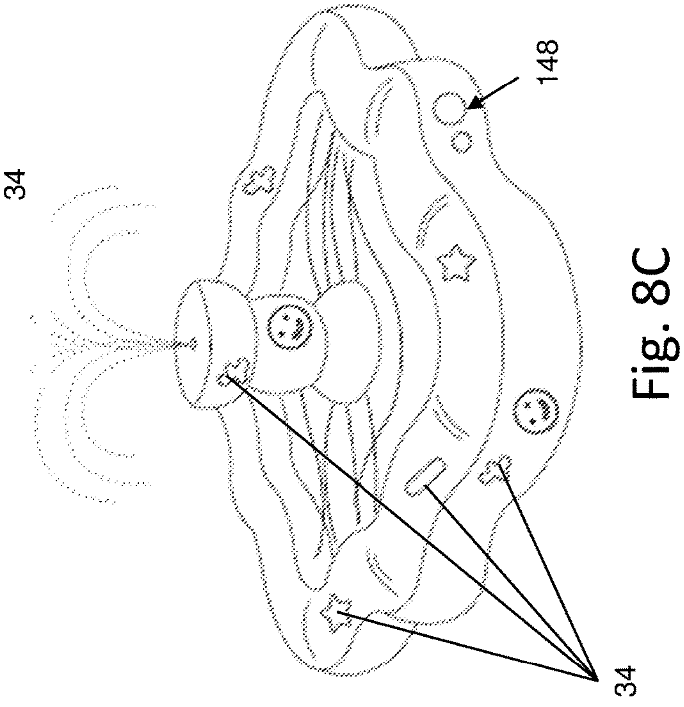
Figures 9A, 9B, 9C, 9D, 9E, 9F:
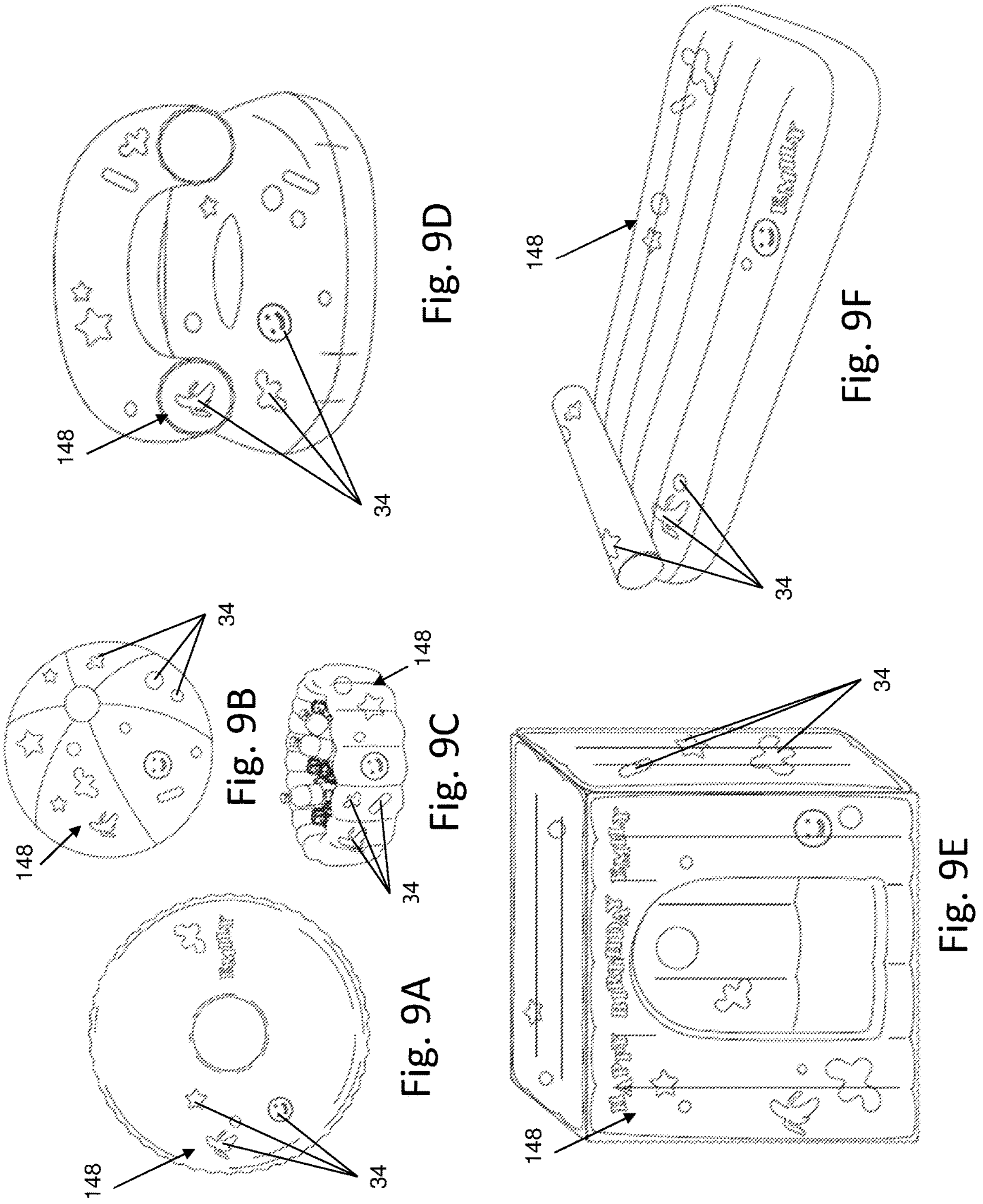
FIGS. 9A-9F show a second set of example vinyl base structures without water according to the invention described herein.

The cling and attachment method described herein is particularly suited for inflatable structures that hold water, such as the pools and fountain shown in FIGS. 8A, 8B and 8C, because the use of the water within the inflatable offers the inherent presence of the liquid needed to temporarily bond the clings to the vinyl structure. Additionally, because the vinyl cling is waterproof, it is the perfect material for customizing an inflatable pool because it will get wet being in such close proximity to the pool. In the alternative embodiments shown in FIGS. 9A-9E, when the clings are used with structures that are not pools, users can replace pool water with liquid from another source to create the bond between the cling and the base structure. Regardless of the particular type of inflatable structure used, users can enjoy the fun of applying and reapplying the vinyl clings in different custom configurations that uniquely display the designs.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the preferred vinyl cling material is a flexible high gloss polyvinyl chloride (PVC) material and the preferred vinyl surface material is a low gloss PVC but other materials could be used without departing from the inventive features described herein. Furthermore, although use of the cling decals according to the invention discussed herein is directed to an inflatable structure, it will be appreciated that base structure on which the cling decals are attached could be other types of structures that move from a flaccid configuration to a taut configuration, such as an umbrella, tent, gazebo, or similar structure. Thus, the breadth and scope of the present invention should not be limited by any of the above-described exemplary embodiments, but should be defined only in accordance with the following claims appended hereto and their equivalents.

What is claimed is:

1. A method for placing a vinyl cling onto an inflatable vinyl surface, comprising the steps of:
- inflating an inflatable structure comprising the inflatable vinyl surface, wherein an inflated configuration of the inflatable structure comprises a three-dimensional nonplanar shape;
- removing the vinyl cling from a backing sheet;
- wetting at least one of an attachment side of the vinyl cling and a space on the inflatable vinyl surface with a first volume of water; and
- pressing the attachment side of the vinyl cling onto the space of the inflatable vinyl surface when the inflatable structure is in the inflated configuration, wherein the space comprises the three-dimensional nonplanar shape during the pressing step;
- coating an uncovered side of the vinyl cling opposite the attachment side and an area surrounding the space of the three-dimensional inflatable vinyl surface proximate to the vinyl cling with a second volume of water;
- filling the inflatable structure with a third volume of water prior to wetting the attachment side of the vinyl cling;
- dipping the vinyl cling into the third volume of water to wet the attachment side with the first volume of water; and
- collecting the second volume of water from the third volume of water prior to coating the uncovered side and the area surrounding the space with the second volume of water.

2. The method of claim 1, further comprising the steps of:
- removing the vinyl cling from the inflatable vinyl surface;
- pressing one of the attachment side and the uncovered side of the vinyl cling onto the backing sheet; and
- deflating the vinyl structure into a deflated configuration.

3. The method of claim 1, further comprising the steps of:
- writing a design onto the uncovered side of the vinyl cling with a permanent ink marker; and
- displaying the design on the vinyl surface via the vinyl cling.

4. The method of claim 1, further comprising the steps of:
- providing a design on the uncovered side of the vinyl cling with a water-activated ink;
- activating the water-activated ink via the step of coating the uncovered side of the vinyl cling opposite the attachment side with the second volume of water; and
- displaying the design on the uncovered side when the water-activated ink is activated.

5. The method of claim 4, further comprising the steps of:

deactivating the water-activated ink via the step of drying the uncovered side of the vinyl cling; and hiding the design on the uncovered side when the water-activated ink is deactivated.

6. The method of claim 1, further comprising the steps of:

providing a design on each of the uncovered side and the attachment side of the vinyl cling;

providing an inflatable structure comprising the three-dimensional inflatable vinyl surface made from a transparent material; and displaying the design on the uncovered side and the attachment side of the vinyl cling via the three-dimensional inflatable vinyl surface of the inflatable structure, and wherein the design on the attachment side of the vinyl cling is unobstructedly visible through the transparent material.

7. The method of claim 6, further comprising the steps of:

providing each of the designs with a water-activated ink;

activating the water-activated ink of the design on the uncovered side via the step of coating the uncovered side of the vinyl cling opposite the attachment side with the second volume of water;

activating the water-activated ink of the design on the attachment side via the step of wetting the attachment side of the vinyl cling with the first volume of water; and displaying the designs on the uncovered side and the attachment side when the water-activated ink is activated.

8. The method claim 1, further comprising the steps of:

removing the vinyl cling from the space on the inflatable vinyl surface;

rewetting at least one of the attachment side of the vinyl cling and another space on the inflatable vinyl surface with a fourth volume of water;

pressing the attachment side of the vinyl cling onto the other space of the inflatable vinyl surface; and coating the uncovered side of the vinyl cling opposite the attachment side and the area surrounding the other space of the three-dimensional inflatable vinyl surface proximate to the vinyl cling with a fifth volume of water.

9. The method of claim 1, wherein each of the attachment side and the uncovered side of the vinyl cling are devoid an adhesive layer.

10. A method for placing a vinyl cling onto an inflatable vinyl surface, comprising the steps of:

providing the vinyl cling having a design on an uncovered side of the vinyl cling with a water-activated ink;

removing the vinyl cling from a backing sheet;

wetting at least one of the attachment side of the vinyl cling and a space on the inflatable vinyl surface with a first volume of water;

filling the inflatable structure with a third volume of water prior to wetting the attachment side of the vinyl cling;

dipping the vinyl cling into the third volume of water to wet the attachment side and the uncovered side with the first volume of water;

pressing the attachment side of the vinyl cling onto the space of the inflatable vinyl surface;

coating the uncovered side of the vinyl cling opposite the attachment side and an area surrounding the space of the three-dimensional inflatable vinyl surface proximate to the vinyl cling with a second volume of water;

collecting the second volume of water from the third volume of water prior to coating the area surrounding the space with the second volume of water;

activating the water-activated ink of the design on the uncovered side via the step of coating the uncovered side of the vinyl cling opposite the attachment side with the second volume of water; and displaying the design on the uncovered side when the water-activated ink is activated.

11. The method of claim 10, further comprising the steps of:

providing the vinyl cling having a second design on the attachment side opposite from the uncovered side;

providing an inflatable structure comprising the inflatable vinyl surface made from a transparent material; and displaying the second design on the attachment side of the vinyl cling via the inflatable structure, wherein the design on the attachment side of the vinyl cling is unobstructedly visible through the transparent material.

12. The method of claim 11, further comprising the steps of:

removing the vinyl cling from the inflatable vinyl surface;

pressing one of the attachment side and the uncovered side of the vinyl cling onto the backing sheet; and deflating the vinyl structure into a deflated configuration.

13. The method of claim 11, further comprising the steps of:

writing a second design onto one of the uncovered side and the attachment side of the vinyl cling with a permanent ink marker; and displaying the second design on the vinyl surface via the vinyl cling.

14. A method for placing a vinyl cling onto an inflatable vinyl surface, comprising the steps of:

providing the vinyl cling having a design on each of an uncovered side and an attachment side;

inflating an inflatable structure made from a transparent material comprising the inflatable vinyl surface, wherein an inflated configuration of the inflatable structure comprises a three-dimensional nonplanar shape;

removing the vinyl cling from a backing sheet;

wetting at least one of the attachment side of the vinyl cling and a space on the inflatable vinyl surface with a first volume of water;

pressing the attachment side of the vinyl cling onto the space of the inflatable vinyl surface when the inflatable structure is in the inflated configuration, wherein the space comprises the three-dimensional nonplanar shape during the pressing step;

coating the uncovered side of the vinyl cling opposite the attachment side and an area surrounding the space of the three-dimensional inflatable vinyl surface proximate to the vinyl cling with a second volume of water;

displaying the design on the attachment side of the vinyl cling and the design on the uncovered side of the vinyl cling via the inflatable structure, wherein the design on the attachment side of the vinyl cling is unobstructedly visible through the transparent material filling the inflatable structure with a third volume of water prior to wetting the attachment side of the vinyl cling;

dipping the vinyl cling into the third volume of water to wet the attachment side with the first volume of water; and collecting the second volume of water from the third volume of water prior to coating the uncovered side and the area surrounding the space with the second volume of water.

15. The method of claim 14, further comprising the steps of:

writing the design onto at least one of the uncovered side and the attachment side of the vinyl cling with a permanent ink marker; and displaying the design on the vinyl surface via the vinyl cling.

16. The method of claim 14, further comprising the steps of:

providing the design on at least one of the uncovered side and the attachment side of the vinyl cling with a water-activated ink;

activating the water-activated ink via one of the steps of coating the uncovered side of the vinyl cling opposite the attachment side with the second volume of water and wetting at least one of the attachment side of the vinyl cling and the space on the inflatable vinyl surface with the first volume of water; and displaying the design on at least one of the uncovered side and the attachment side of the vinyl cling when the water-activated ink is activated.

* * * * *